US011148484B2

(12) United States Patent
Ottens et al.

(10) Patent No.: US 11,148,484 B2
(45) Date of Patent: Oct. 19, 2021

(54) VALVE STEM MADE OF THERMOPLASTIC MATERIAL

(71) Applicants: BASF SE, Ludwigshafen am Rhein (DE); Schwalbe-Ralf Bohle GmbH, Reichshof (DE)

(72) Inventors: Mark Ottens, Lemfoerde (DE); Oliver Steffen Henze, Lemfoerde (DE); Felix Schaefermeier, Reichshof (DE)

(73) Assignees: BASF SE, Ludwigshafen am Rhein (DE); SCHWALBE-RALF BOHLE GMBH, Reichshof (DE)

( * ) Notice: Subject to any disclaimer, the term of this patent is extended or adjusted under 35 U.S.C. 154(b) by 0 days.

(21) Appl. No.: 16/626,123

(22) PCT Filed: Jul. 13, 2018

(86) PCT No.: PCT/EP2018/069130
§ 371 (c)(1),
(2) Date: Dec. 23, 2019

(87) PCT Pub. No.: WO2019/012126
PCT Pub. Date: Jan. 17, 2019

(65) Prior Publication Data
US 2020/0122532 A1  Apr. 23, 2020

(30) Foreign Application Priority Data

Jul. 14, 2017  (EP) .................................... 17181469

(51) Int. Cl.
*F16K 15/20* (2006.01)
*B60C 29/00* (2006.01)

(52) U.S. Cl.
CPC ....... *B60C 29/005* (2013.01); *Y10T 137/3584* (2015.04)

(58) Field of Classification Search
CPC ......... Y10T 137/3584; Y10T 137/3786; Y10T 137/374; B60C 29/00; B60C 29/005
USPC ...................................................... 251/368
See application file for complete search history.

(56) References Cited

U.S. PATENT DOCUMENTS

| | | | |
|---|---|---|---|
| 3,994,319 A * | 11/1976 | Airhart ................ | C22C 47/025 137/855 |
| 4,695,602 A * | 9/1987 | Crosby ................... | C08K 7/02 251/368 |
| 4,768,574 A | 9/1988 | Probst | |
| 8,695,634 B2 * | 4/2014 | Yashima ................. | F16K 41/00 137/625.17 |
| 9,771,801 B2 * | 9/2017 | Schumacher ............ | B63H 1/06 |
| 2002/0050298 A1 * | 5/2002 | Kikuchi ................ | F16K 15/144 137/859 |
| 2006/0102240 A1 * | 5/2006 | Spiegl ..................... | F16K 15/10 137/855 |
| 2007/0203320 A1 | 8/2007 | Gestermann et al. | |
| 2008/0085968 A1 | 4/2008 | Urtel et al. | |
| 2009/0173903 A1 * | 7/2009 | Kaneko ................. | F16K 27/062 251/309 |
| 2009/0200506 A1 * | 8/2009 | Cassina ............... | F16K 27/0218 251/368 |
| 2015/0090385 A1 | 4/2015 | Hachmeyer et al. | |
| 2015/0183283 A1 | 7/2015 | Mattfeld et al. | |
| 2019/0307534 A1 * | 10/2019 | Schwitalla ............... | A61C 8/00 |

FOREIGN PATENT DOCUMENTS

| | | |
|---|---|---|
| DE | 85 16 229 U1 | 11/1986 |
| EP | 0 211 301 A2 | 2/1987 |
| EP | 1 826 225 A2 | 8/2007 |
| EP | 2 857 226 A1 | 4/2015 |
| WO | WO 2006/074997 A1 | 7/2006 |
| WO | WO 2010/089080 A1 | 8/2010 |
| WO | WO 2013/189890 A1 | 12/2013 |

OTHER PUBLICATIONS

"Elastollan Material Properties", printed Oct. 20, 2005.*
International Preliminary Report on Patentability dated Oct. 4, 2017 in PCT/EP2018/069130 (with English translation), 6 pages.
International Search Report dated Oct. 5, 2018 in PCT/EP2018/069130 (submitting English translation only), 3 pages.
Rothon, R.N., Particulate-Filled Polymer Composites (2nd Edition), 2003, Smithers Rapra Technology, pp. 357-424.
Plastics Additive Handbook, 5th edition, H. Zweifel, ed., Hanser Publishers, Müchen, 2001, pp. 98-136.

* cited by examiner

*Primary Examiner* — Robert K Arundale
(74) *Attorney, Agent, or Firm* — Grüneberg and Myers PLLC

(57) ABSTRACT

The present invention relates to a tire valve, in particular a bicycle tire valve, comprising a tubular stem, where the stem consists of a composition (Z1) comprising a thermoplastic (P1) and comprising a filler (F1), and also to a valve stem for the production of a tire valve, where the valve stem is tubular and consists of a composition (Z1) comprising a thermoplastic (P1) and comprising a filler (F1). The present invention further relates to the use of the valve of the invention for the production of a molding comprising an inflatable tube section, in particular an inner tube for a tire, and also to the use of the valve of the invention for the production of a tubeless bicycle tire.

14 Claims, No Drawings

VALVE STEM MADE OF THERMOPLASTIC MATERIAL

The present invention relates to a tire valve, in particular a bicycle tire valve, comprising a tubular stem, where the stem consists of a composition (Z1) comprising a thermoplastic (P1) and comprising a filler (F1), and also to a valve stem for the production of a tire valve, where the valve stem is tubular and consists of a composition (Z1) comprising a thermoplastic (P1) and comprising a filler (F1). The present invention further relates to the use of the valve of the invention for the production of a molding comprising an inflatable tube section, in particular an inner tube for a tire, and also to the use of the valve of the invention for the production of a tubeless bicycle tire.

Manufacture of tubes for tires, for example bicycle tires, is usually based on rubber. Tube systems used in tires conventionally comprise rubber tubes or latex tubes respectively cast in annular form or with ends adhesive-bonded to one another, and with wall thickness from 0.1 mm to 3 mm. There are also known tubes produced from thermoplastics, for example from thermoplastic polyurethane. Features of the latter are that they are stronger than rubber-based tubes and, by virtue of reduced wall thicknesses, are significantly lighter. However, they currently still have considerably higher production costs than rubber-based tubes.

By way of example, WO 2010/089080 A1 discloses a tube system, in particular a tube system for tires, and also processes for production of the tubes. According to WO 2010/089080 A1, tubes are produced by means of extrusion and shortened to the appropriate length. The ends of the tubes are then welded to give an annular tube.

WO 2013/189890 A1 moreover discloses that it is also possible to manufacture the valves with stems made of thermoplastics.

However, known valves made of thermoplastics have the disadvantage that the properties of the material worsen at increased or decreased temperatures: it has been found that a stem made of thermoplastic polyurethane fails at relatively high temperatures that arise by way of example during downhill travel and the braking associated therewith, and that heat can cause the valve to deform and can thus cause loss of integrity of the valve. The material can also contract at relatively low temperatures, and this can lead to deformation of the valve stem.

Another phenomenon that can occur with known valves made of thermoplastics in the event of what is known as "tire migration", which can occur during severe braking, when the tire departs from its position on the wheel rim, is action of a force on the valve stem that can lead to valve deformation.

It has also been found that inflation leads to high mechanical loadings, and that here again a stem made of a thermoplastic can fail in certain cases, for example because of inadequate resilience or flexural behavior.

It has moreover been found that known valves made of thermoplastics which have a smooth surface structure can exhibit inadequate adhesion between stem and air pump head. When high inflation pressures (>6 bar) are used, the air pump head, which is mostly fixed by means of a clamping mechanism, separates from the valve stem. This leads to difficulties in inflation.

Starting from the prior art, it was therefore an object of the present invention to provide a tire valve which can be produced without difficulty, can be secured successfully on a tube section, and has good mechanical properties over a wide range of temperatures. Another object of the present invention was to provide a tire valve which also permits successful inflation at relatively high pressure.

Said object is achieved in the invention via a tire valve comprising a tubular stem, where the stem consists of a composition (Z1) comprising a thermoplastic (P1) and comprising a filler (F1). The present invention also provides a valve stem for the production of a tire valve where the valve stem is tubular and consists of a composition (Z1) comprising a thermoplastic (P1) and comprising a filler (F1).

For the purposes of the present invention, the tire valve is in particular a bicycle tire valve.

The valve stem in the invention consists of a composition (Z1), comprising a thermoplastic (P1) and comprising a filler (F1).

Surprisingly, it has been found that the use of this type of valve stem gives a valve that firstly has adequate stability and good mechanical properties and secondly has a surface structure that provides good adhesion of the air pump head during inflation.

The chemical nature and the form of the filler (F1) can vary widely in the invention, as long as there is adequate compatibility with the thermoplastic (P1). Selection of the filler (F1) here should be such that the form and particle size of the filler permit adequate miscibility and uniform distribution in the composition.

Examples of suitable fillers are glass fibers, glass spheres, carbon fibers, aramid fibers, potassium titanate fibers, fibers made of liquid-crystalline polymers, organic fibrous fillers or inorganic reinforcing materials. Organic fibrous fillers are by way of example cellulose fibers, hemp fibers, sisal or kenaf. Inorganic reinforcing materials are by way of example ceramic fillers such as aluminum nitride and boron nitride, or mineral fillers such as asbestos, talc, wollastonite, Microvit, silicate, chalk, calcined kaolins, mica and powdered quartz.

For the purposes of the present invention, preference is given to fibrous fillers. The diameter of the fibers is generally from 3 to 30 µm, preferably from 6 to 20 µm and particularly preferably from 8 to 15 µm. The length of the fibers in the compounding material is generally from 20 µm to 1000 µm, preferably from 180 to 500 µm and particularly preferably from 200 to 400 µm.

Another embodiment of the present invention accordingly also provides a valve as described above or a valve stem as described above where the filler is fibrous.

The fillers, for example the fibrous fillers, can have been pretreated to improve compatibility with the thermoplastic, for example with a silane compound.

It is therefore possible in the invention that the surface of the filler is surrounded at least to some extent by a coating, another term used here being at least partial coat. Another term often used for the coating is surface treatment. The coating either adheres on the filler by purely physical means, via interlocking or van der Waals forces, or has chemical bonding to the filler. This is achieved mainly via covalent interaction.

The surface treatment or else surface modification, leading to a coating around the enclosed particle, in the present case the filler, is described in detail in the literature. "Particulate-Filled Polymer Composites (2nd edition), edited by: Rothon, Roger N., 2003, Smithers Rapra Technology is a basic work which describes suitable materials and also the technology of coating. Chapter 4 is particularly relevant. Appropriate materials are obtained commercially, e.g. from Nabaltec, Schwandorf or Martinswerke in Bergheim, both in Germany.

Preferred coating materials are saturated or unsaturated polymers having an acid function, preferably having at least one acrylic acid function or one anhydride function.

Coating materials that are likewise preferred are monomeric organic acids and their salts, preferably saturated fatty acids; unsaturated acids are less commonly used. Preferred fatty acids comprise from 10 to 30 carbon atoms, preferably from 12 to 22, in particular from 16 to 20 carbon atoms; they are aliphatic and preferably have no double bonds. Very particular preference is given to stearic acid. Preferred fatty acid derivatives are their salts, preferably calcium, aluminum, magnesium or zinc. Particular preference is given to calcium, in particular in the form of calcium stearate.

Other preferred substances which form a coating on the filler are organosilane compounds having the following structure:

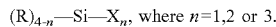

$(R)_{4-n}$—Si—$X_n$, where $n=1,2$ or 3.

X is a hydrolyzable group, also termed coupling group, which reacts with the surface of the filler. It is preferable that the moiety R is a hydrocarbon moiety and has been selected to give good miscibility of the organosilane compound with the thermoplastic polyurethane. The moiety R has bonding to the silicon by way of a hydrolytically stable carbon-silicon bond, and can be reactive or inert. An example of a reactive moiety, which is preferably an unsaturated hydrocarbon moiety, is an allyl moiety. The moiety R is preferably inert, more preferably being a saturated carbon-hydrogen moiety having from 2 to 30 carbon atoms, preferably from 6 to 20 carbon atoms and particularly preferably from 8 to 18 carbon atoms; this is more preferably a branched-chain or linear aliphatic hydrocarbon moiety.

The organosilane compound more preferably comprises only one moiety R and has the general formula:

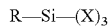

R—Si—$(X)_3$

The coupling group X is preferably a halogen, preferably chlorine, and the coupling reagent is accordingly a tri-, di- or monochlorosilane. It is likewise preferable that the coupling group X is an alkoxy group, preferably a methoxy group or an ethoxy group. It is very preferable that the moiety is the hexadecyl radical, preferably with the methoxy or ethoxy coupling group, the organosilane therefore being hexadecylsilane.

The quantity of the silanes applied to the filler, based on the total quantity of the latter, is from 0.1% by weight to 5% by weight, more preferably from 0.5% by weight to 1.5% by weight and particularly preferably about 1% by weight. The quantity of carboxylic acids and carboxylic derivatives applied to the filler, based on the total quantity of the latter is from 0.1% by weight to 5% by weight, more preferably from 1.5% by weight to 5% by weight and particularly preferably from 3% by weight to 5% by weight.

It is preferable to use inorganic fibrous fillers. Use of inorganic fibrous fillers is found to give a greater reinforcement effect, and also greater heat resistance.

Particularly preferred inorganic fibers for the present invention are in particular coated glass fibers made of glass, preferably E glass, with thickness from 3 to 30 µm, in particular from 8 to 15 µm, and also with a maximum of the fiber length distribution in the range from 0.03 mm to about 15 mm, in particular from 1 to 10 mm, these being produced in accordance with the prior art.

The composition (Z1) in the invention can also comprise 2 or more fillers.

The proportion of the filler (F1) in the composition (Z1) is by way of example in the range from 5 to 55% by weight, based on the entire composition (Z1), preferably in the range from 10 to 50% by weight, based on the entire composition (Z1), more preferably in the range from 15 to 40% by weight, based on the entire composition (Z1), particularly preferably in the range from 20 to 30% by weight, based on the entire composition (Z1).

Another embodiment of the present invention accordingly also provides a valve as described above or a valve stem as described above where the composition (Z1) comprises, based on the entire composition (Z1), a quantity in the range from 5 to 55% by weight of the filler (F1).

The composition (Z1) in the invention comprises a thermoplastic (P1). It is preferable that the toughness and ductility of the thermoplastic used ensures that the stem does not fracture at low temperatures. Suitable thermoplastics are by way of example tough or toughness-modified grades from the groups of the styrenes, styrene copolymers, polyamides, polyesters, polyethers such as polyoxymethylene, polyolefins and polyurethanes. Particular preference is given to a thermoplastic that is suitable for temperatures extending as far as minus 30° C.

The composition (Z1) in the invention can also comprise 2 or more thermoplastics.

A particularly preferred material is thermoplastic polyurethane (TPU), which in the hardened state has the strength required for the use as valve stem, and has elasticity that permits bending of the stem without fracture. This type of valve provides advantages in respect of a wide variety of design variants, and also in accessibility and handling, e.g. during inflation of a tire.

Another embodiment of the present invention accordingly also provides a valve as described above or a valve stem as described above where the thermoplastic (P1) is a thermoplastic polyurethane.

Any thermoplastic polyurethane is in principle suitable for the composition (Z1) for the production of the valve stem. The properties of the thermoplastic polyurethane used here can vary widely. The Shore hardness of the thermoplastic polyurethane is preferably in the range from 85 A to 85 D, more preferably in the range from 90 A to 50 D and particularly preferably in the range from 95 A to 98 A.

Another embodiment of the present invention accordingly also provides a valve as described above or a valve stem as described above where the Shore hardness of the thermoplastic polyurethane is in the range from 85 A to 85 D.

Another embodiment of the present invention moreover also provides a valve as described above or a valve stem as described above where the modulus of elasticity of the thermoplastic polyurethane is in the range from 500 to 8000 MPa, determined in the tensile test in accordance with DIN EN ISO 527.

Another embodiment of the present invention uses a thermoplastic polyurethane with lower hardness so that the valve stem is flexible. This makes the valve more accessible for some applications.

Thermoplastic polyurethanes are well known. The thermoplastic polyurethanes are produced in the invention via reaction of diisocyanates, which are also termed component a), with polyols and optionally with other compounds reactive toward isocyanates, the term component b) also being used for the entirety of these, and with chain extenders, which are also termed component c), optionally in the presence of catalysts, which are also termed component d), and/or of conventional auxiliaries and/or additional substances, which are also termed component e).

The components a), b), c) usually used in the production of the polyurethanes, and also optionally d) and/or e), will be described by way of example below:

Organic isocyanates used, component a), can be well known aromatic, aliphatic, cycloaliphatic and/or araliphatic isocyanates, preferably diisocyanates, more preferably diphenylmethane 2, 2'-, 2,4'- and/or 4,4'-diisocyanate (MDI), naphthylene 1,5-diisocyanate (NDI), tolylene 2,4- and/or 2,6-diisocyanate (TDI), diphenylmethane diisocyanate, 3,3'-dimethyldiphenyl diisocyanate, 1,2-diphenylethane diisocyanate and/or phenylene diisocyanate, tri-, tetra-, penta-, hexa-, hepta- and/or octamethylene diisocyanate, 2-methylpentamethylene 1,5-diisocyanate, 2-ethylbutylene 1,4-diisocyanate, pentamethylene 1,5-diisocyanate, butylene 1,4-diisocyanate, 1-isocyanate-3,3,5-trimethyl-5-isocyanatomethylcyclohexane (isophorone diisocyanate, IPDI), 1-isocyanato-4-[(4-isocyanatocyclohexyl)methyl]cyclohexane (H12MDI), 2,6-diisocyanatohexanecarboxylic ester, 1,4- and/or 1,3-bis(isocyanatomethyl)cyclohexane (HXDI), cyclohexane 1,4-diisocyanate, 1-methylcyclohexane 2,4- and/or -2,6-diisocyanate and/or dicyclohexylmethane 4,4'-, 2,4'- and 2,2'-diisocyanate, preferably diphenylmethane 2, 2'-, 2,4'- and/or 4,4'-diisocyanate (MDI), naphthylene 1,5-diisocyanate (NDI), tolylene 2,4- and/or 2,6-diisocyanate (TDI), hexamethylene diisocyanate, 1-isocyanato-4-[(4-isocyanatocyclohexyl)methyl]cyclohexane, and/or IPDI. An example of other suitable aliphatic isocyanates is hexamethylene diisocyanate (HDI) or 1-isocyanato-4-[(4-isocyanatocyclohexyl)methyl]cyclohexane (H12MDI).

Isocyanates particularly preferred in the invention are hexamethylene diisocyanate (HDI), diphenylmethane 2,2'-, 2,4'- and/or 4,4'-diisocyanate (MDI) and tolylene 2,4- and/or 2,6-diisocyanate (TDI), and 1-isocyanato-4-[(4-isocyanatocyclohexyl)methyl]cyclohexane (H12MDI), particular preference being given here to diphenylmethane 2,2'-, 2,4'- and/or 4,4'-diisocyanate (MDI), in particular diphenylmethane 4,4'-diisocyanate.

Another embodiment of the present invention also provides a valve as described above or a valve stem as described above where the thermoplastic polyurethane is based on an aromatic isocyanate.

Compounds that can be used as component b), reactive toward isocyanates, are the well-known compounds reactive toward isocyanates, for example polyesterols, polyetherols and/or polycarbonatediols, all of which are also commonly described by the term "polyols", with molar masses (Mn), preferably number-average molar masses, from 500 g/mol to 8000 g/mol, preferably from 600 g/mol to 6000 g/mol, in particular from 800 g/mol to less than 3000 g/mol, and preferably with average functionality toward isocyanates of from 1.8 to 2.3, preferably from 1.9 to 2.2, in particular 2. Number-average molar mass is determined in accordance with DIN 55672-1.

Polyesterols that can be used are polyesters based on diacids and on diols. Diols used are preferably diols having from 2 to 10 carbon atoms, for example ethanediol, butanediol or hexanediol, in particular 1,4-butanediol or a mixture thereof. Diacids used can be any of the known diacids, for example linear or branched-chain diacids having from 4 to 12 carbon atoms or a mixture thereof.

Another component b) used is polyether polyols, for example those based on well-known starter substances and on conventional alkylene oxides, preferably ethylene oxide, propylene oxide and/or butylene oxide, more preferably polyetherols based on propylene 1,2-oxide and ethylene oxide, and in particular polyoxytetramethylene glycols. The advantage of the polyether polyols lies inter alia in higher hydrolysis resistance.

Preferred polyetherols that can moreover be used are those known as polyetherols with low unsaturation level. For the purposes of this invention, polyetherols with low unsaturation level are in particular polyether alcohols with content of unsaturated compounds that is less than 0.02 meq/g, preferably less than 0.01 meq/g. These polyether alcohols are mostly produced via an addition reaction of alkylene oxides, in particular ethylene oxide, propylene oxide and mixtures thereof, onto the diols or triols described above in the presence of high-activity catalysts.

These high-activity catalysts are preferably cesium hydroxide and multimetal cyanide catalysts, also termed DMC catalysts. A DMC catalyst frequently and preferably used is zinc hexacyanocobaltate. The DMC catalyst can be allowed to remain in the polyether alcohol after the reaction, but is usually removed, for example by sedimentation or filtration.

It is also possible to use, as component b), a mixture of various polyols instead of a single polyol. Suitable thermoplastic polyurethanes for the purposes of the present invention are by way of example those based on polyesters or on polyethers.

Chain extenders, component c), used can be well known aliphatic, araliphatic, aromatic and/or cycloaliphatic compounds with molar mass, preferably average molar mass, from 50 g/mol to 499 g/mol, preferably difunctional compounds. Preference is given by way of example to alkane diols having from 2 to 10 carbon atoms in the alkylene moiety, preferably 1,4-butanediol, 1,6-hexanediol and/or di-, tri-, tetra-, penta-, hexa-, hepta-, octa-, nona- and/or decalkylene glycols having from 3 to 8 carbon atoms, more preferably unbranched alkane diols, in particular propane-1,3-diol, butane-1,4-diol and hexane-1,6-diol.

Suitable catalysts, component d), which in particular accelerate the reaction between the NCO groups of the diisocyanates, component a), and component b) are the tertiary amines that are conventional and known in the prior art, for example preferably triethylamine, dimethylcyclohexylamine, N-methylmorpholine, N,N'-dimethylpiperazine, 2-(dimethylaminoethoxy)ethanol, diazabicyclo[2.2.2]octane and the like and also in particular organometallic compounds such as titanic esters, iron compounds, for example preferably iron(III) acetylacetonate, tin compounds, for example preferably tin diacetate, tin dioctanoate, tin dilaurate or the dialkyl tin salts of aliphatic carboxylic acids, for example dibutyl tin diacetate, dibutyl tin dilaurate, or the like. Quantities usually used of the catalysts are typically from 0.00001 part by weight to 0.1 part by weight per 100 parts by weight of polyhydroxy compound, component b).

Materials that can be added to the structural components a) to c) are not only catalysts, component d), but also conventional added substances and/or auxiliaries, component e). Mention may be made by way of example of blowing agents, surface-active substances, flame retardants, nucleating agents, lubricants and mold-release aids, dyes and pigments, stabilizers, for example preferably with respect to hydrolysis, light, heat or discoloration, inorganic and/or organic fillers, plasticizers and metal deactivators. Hydrolysis stabilizers preferably used are oligomeric and/or polymeric aliphatic or aromatic carbodiimides.

The thermoplastic polyurethane can be produced by the known processes batchwise or continuously, for example by reactive extruders or by the belt process in the one-shot or the prepolymer process, preferably in the one-shot process. The reacting components a), b) and optionally c), d) and/or e) can be mixed with one another in succession or simultaneously in these processes, whereupon the reaction immediately begins. In the extruder process the structural components a) and b), and also optionally the other components c), d) and/or e) are introduced individually or as mixture into the extruder, and by way of example reacted preferably at temperatures of from 100° C. to 280° C., more preferably from 140° C. to 250° C., and the resultant polyurethane is then extruded, cooled and pelletized.

The polyol component, component b), and chain extender, component c), or the ratios of the components used, can be varied in order to optimize the properties of the thermoplastic polyurethane used.

In a preferred embodiment, the index for the reaction of the isocyanate, component a), with the isocyanate-reactive components b) and optionally c) is from 900 to 1100, particularly preferably from 950 to 1050, in particular from 980 to 1020. The index here is defined via the ratio of the entirety of isocyanate groups of component a) used in the reaction to the isocyanate-reactive groups, i.e. in particular the groups of components b) and c). When the index is 1000, there is one active hydrogen atom for each isocyanate group of component a). When indices are above 1000, there are more isocyanate groups than OH groups.

In order to stabilize the polyurethanes, and compositions (Z1) produced therefrom, with respect to ageing it is possible to add stabilizers to the polyurethane, another term used for these being auxiliaries. For the purposes of the present invention, stabilizers are additives which provide protection to a plastic or a plastics mixture with respect to detrimental environmental effects. Examples are primary and secondary antioxidants, thiosynergists, organophosphorus compounds of trivalent phosphorus, hindered amine light stabilizers, UV absorbers, hydrolysis stabilizers, quenchers and flame retardants.

Further information about the abovementioned auxiliaries and additional substances can be found in the technical literature, for example from Plastics Additives Handbook, 5th edition, H. Zweifel, ed., Hanser Publishers, Munich, 2001, pp. 98-136.

A preferred embodiment of the present invention uses a thermoplastic polyurethane (TPU) having aromatic groups, for example a thermoplastic polyurethane based on an aromatic isocyanate.

The proportion of the thermoplastic (P1) in the composition (Z1) is preferably in the range from 45 to 95% by weight, based on the entire composition (Z1), for example in the range from 50 to 90% by weight, based on the entire composition (Z1), more preferably in the range from 60 to 85% by weight, based on the entire composition (Z1), particular preferably in the range from 70 to 80% by weight, based on the entire composition (Z1).

Another embodiment of the present invention accordingly also provides a valve as described above or a valve stem as described above where the composition (Z1) comprises a quantity of the thermoplastic (P1) in the range from 45 to 95% by weight, based on the entire composition (Z1).

It is possible in the invention that the composition (Z1) also comprises other components alongside the thermoplastic (P1) and the filler (F1), examples being mold-release auxiliary, UV stabilizer, antioxidant or color pigment.

Suitable processes for the production of the composition (Z1) are known per se to the person skilled in the art. Compounding processes known per se are usually used for the purposes of the present invention.

The valve stem in the invention consists of the composition (Z1).

A valve stem can be produced from the composition (Z1) by way of example via injection molding, extrusion and/or sintering processes. Presence is given to production by means of injection-molding or extrusion processes. It is possible in the invention that, after the production of the valve stem, a screwthread is cut into the valve stem in order to permit attachment of a closure system. It is equally possible that the screwthread is produced during the production process, for example during production of the valve stem by means of injection-molding processes.

Suitable injection-molding machines are known per se. By way of example, suitable injection-molding machines are those equipped with single-flight screws, preferably single-flight screws with a plurality of zones.

Suitable processing temperatures are by way of example the range from 180 to 260° C., preferably in the range from 190 to 250° C., more preferably in the range from 200 to 240° C.

The valve of the invention, usually comprises not only the valve stem but also a valve base. The valve base usually consists of a thermoplastic, for example of a thermoplastic polyurethane, which by way of example can be cast onto the valve stem.

Another embodiment of the present invention accordingly also provides a valve as described above where the valve comprises a valve base made of a thermoplastic material.

The design of the valve here can, for the purposes of the present invention, be such that it is suitable for securing on an inner tube or tube section for a tire, in particular on an inner tube or tube section for a bicycle tire.

The present invention accordingly also provides the use of a valve as described above for the production of a molding comprising an inflatable tube section. Another embodiment of the present invention also provides the use as described above where the molding is an inner tube for a tire.

It has proven to be advantageous here to select, as material for the production of the valve base, a thermoplastic polyurethane which has mechanical properties, for example elasticity and elongation, corresponding to those of the tube material. The valve base and the tube section on which the valve base is to be secured are particularly advantageously produced from the same material. An appropriate choice of material significantly reduces the probability that different properties of materials will cause stress cracking or disintegration during inflation or as a result of loading during use of the tube section.

The starting materials and production processes for the valve base made of thermoplastic polyurethane correspond to the abovementioned materials for the production of a valve stem made of thermoplastic polyurethane.

The valve base preferably uses a thermoplastic polyurethane with Shore hardness from 40 A to 70 D, preferably from 50 A to 50 D, more preferably from 70 A to 90 A. For the processing of TPU is helpful to use lubricants alongside the abovementioned additives. Said lubricants are selected from the groups of the fatty acid amides, the montanic esters, glycerol derivatives and polyolefins, and also combinations thereof. The individual compounds can be found in EP 1 826 225 A2 and the literature cited therein. The proportion of processing aids selected for the process of the invention should be minimized in order to maximize adhesion of the valve stem to the bicycle tube. The proportion of lubricant to be selected, based on the entire formulation, is from 0.001 to 2% by weight, preferably from 0.01 to 1% by weight and particularly preferably from 0.05 to 0.5% by weight.

The present invention accordingly also provides a process for the production of a valve as described above, characterized in that the stem is inserted into a casting mold and, during casting around the stem in the casting mold, the valve base is produced.

In preferred embodiments of the invention, the extent to which the valve base encloses the stem in axial direction is at least 3 mm, particularly preferably at least 5 mm. In preferred embodiments of the invention the dimensioning of the valve base is moreover such that the extent to which the valve base projects in each radial direction beyond the exterior perimeter of the stem at the end of the stem at least corresponds to half of the diameter of the stem at its lower end. It is particularly preferable that the extent to which the valve base projects in each radial direction beyond the exterior perimeter of the stem at the end of the stem at least corresponds to the diameter of the stem at its lower end. If, by way of example, the diameter of the stem at its lower end is 5 mm, the extent to which the valve base projects in each radial direction beyond the exterior perimeter of the stem at the end of the stem is preferably at least 2.5 mm, particularly preferably at least 5 mm. The external diameter of the valve base in this example is therefore preferably at least 10 mm, particularly preferably at least 15 mm.

The terms "axial direction" and "radial direction" relate to the axis of the stem, the shape of which is usually cylindrical. The minimum dimensions in axial and radial direction ensure that after the valve has been secured on a tube section the stem has secure bonding to the tube section and no loss of integrity arises that could by way of example cause escape of air from the tube interior into the environment.

The valve base compact area intended for securing on a tube section can have various shapes. In one embodiment it is circular, and therefore the valve base projects to an identical extent in each radial direction beyond the exterior perimeter of the stem at its lower end. In another embodiment the contact area is oval, and the above minimum dimensions here relate to the projection along the transverse axis. The transverse axis is the shorter axis of the oval, the term used for the longer axis being longitudinal axis. The dimension of the contact area of the valve base in the longitudinal axis is preferably from 1.5 to 3 times its dimension in the transverse axis.

Another aspect of the invention provides the use of the valve of the invention for the production of a tire manufactured from a thermoplastic polyurethane and having a hole through which air can be passed into the tube. Around the entire periphery of said hole, there is adhesive bonding in the invention between the tube section and the valve base of a valve of the invention, and there is therefore integral bonding between the space within the tube and the space within the stem. Suitable materials for the production of the tube section are known per se, as also are processes for production thereof, for example extrusion, injection molding or blow molding.

For the purposes of the present invention, the composition of the material of the tube section can be the same as that of the material of the valve. It is equally possible that the composition of the tube section differs from that of the valve, or that they consist of different materials.

For the purposes of the present invention, it is preferable that the tube section and the valve consist at least to some extent of a thermoplastic polyurethane, but the thermoplastic polyurethanes used for tube section and valve do not usually have the same hardness.

The starting materials and production processes for the tube section made of thermoplastic polyurethane correspond to the abovementioned materials for the production of a valve stem made of thermoplastic polyurethane.

For the tube section it is preferable to use a thermoplastic polyurethane with Shore hardness from 40 A to 70 D, preferably from 50 A to 50 D, more preferably from 70 A to 90 A.

There are various ways of producing a durable bond between the valve base and the surface surrounding the hole in the tube section. By way of example, known adhesives are suitable for this purpose, in particular adhesives based on polyurethane.

In a preferred method of bonding the valve to the tube section, the underside of the valve base is weighted by a solvent and then is pressed onto the surface of the tube section. Another term used for this process in which an interlocking adhesive bond is obtained after the solvated surface of the valve base is pressed onto the tube surface is "solvent welding". The solvent is particularly preferably selected from the group of the ethers, cyclic ethers, amines, amides, alcohols and halogenated hydrocarbons. In particular, the solvent comprises methanol, ethanol, isopropanol, dimethylformamide, n-methylpyrrolidone and/or tetrahydrofuran. Mixtures of the abovementioned substances are likewise preferred.

In another preferred variant the bonding between valve base and tube section is produced by means of another welding process. In particular, a suitable process is thermal welding, high-frequency welding or ultrasound welding.

The present invention accordingly provides a process for the production of a tube section as described above, characterized in that the valve base is bonded to the tube section by means of a welding process, in particular by means of thermal welding, high-frequency welding or ultrasound welding.

For the purposes of the present invention, it is possible here to begin by introducing, into the tube section, a hole that permits inflation of the finished tube, and then to apply the valve, or the valve base, at the hole. However, it is also possible to begin by bonding the valve to the tube section and then to produce the hole via the valve stem.

The valve of the invention, and tube sections equipped therewith can be produced easily and at low cost. The bonds between valve stem and valve base on the one hand and between valve and tube section on the other hand are robust and secure, and the subject matter of the invention is therefore suitable for a wide range of possible uses.

However, in an alternate embodiment for the purposes of the present invention it is also possible that the design of the valve of the invention is such that it is suitable for the production of a tubeless tire, in particular of a tubeless bicycle tire, of what is known as a tubeless system. Suitable valves usually have a valve base made of a thermoplastic.

The valve base here usually seals the tubeless system, consisting of tire and wheel rim, on the internal side of the wheel rim. The valve stem is secured by means of a nut on the wheel rim, and is particularly suitable because it can withstand high mechanical loading.

The valve in this embodiment preferably comprise a valve base, the design of which particularly preferably uses a round outline. By way of example, the valve base can be of cylindrical conical shape, and can be injected onto the valve stem in the production process.

For reliable provision of an interlocking bond with the wheel rim or valve hole, the valve base has preferably been manufactured from a thermoplastic material with hardness lower than that of the valve stem. The valve stem acts as core material to prevent slippage of the valve through the valve hole in the wheel rim. Complete sealing of the system requires use of a wheel rim nut to secure the valve stem. The valve stem preferably has an external screwthread for this purpose.

Another embodiment of the present invention accordingly also provides a valve as described above where the valve stem has an external screwthread.

Another aspect of the present invention therefore also provides the use of the valve of the invention as described above for the production of a tubeless bicycle tire.

The present invention also provides a molding comprising an inflatable tube section and a valve as described above, where the tube section and the valve have connection to one another by way of a valve base. The molding can by way of example be an inner tube for a tire, for example an inner tube for a bicycle tire, i.e. a bicycle tube.

The valves of the invention and inflatable tube sections of the invention are suitable by way of example for the production of inner tubes, in particular for the production of inner tubes for bicycles.

As mentioned above, the valves of the invention are also suitable for the production of tubeless tires for bicycles.

Embodiments of the present invention are listed by way of example below, but do not restrict the present invention. In particular, the present invention also comprises embodiments which result from the dependencies stated below, i.e. from combinations.

1. A tire valve comprising a tubular stem, where the stem consists of a composition (Z1) comprising a thermoplastic (P1) and comprising a filler (F1).
2. The valve according to embodiment 1, where the thermoplastic (P1) is a thermoplastic polyurethane.
3. The valve according to embodiment 1 or 2, where the filler (F1) is fibrous.
4. The valve according to any of embodiments 1 to 3, where the composition (Z1) comprises, based on the entire composition (Z1), a quantity in the range from 5 to 55% by weight of the filler (F1).
5. The valve according to any of embodiments 2 to 4, where the Shore hardness of the thermoplastic polyurethane is in the range from 85 A to 85 D.
6. The valve according to any of embodiments 2 to 5, where the modulus of elasticity of the thermoplastic polyurethane is in the range from 500 to 8000 MPa, determined in the tensile test in accordance with DIN EN ISO 527.
7. The valve according to any of embodiments 2 to 6, where the thermoplastic polyurethane is based on an aromatic isocyanate.
8. The valve according to any of embodiments 1 to 7, where the valve comprises a valve base made of a thermoplastic material.
9. A valve stem for the production of a tire valve, where the valve stem is tubular and consists of a composition (Z1) comprising a thermoplastic (P1) and comprising a filler (F1).
10. The valve stem according to embodiment 9, where the thermoplastic (P1) is a thermoplastic polyurethane.
11. The valve stem according to embodiment 9 or 10, where the filler (F1) is fibrous.
12. The valve stem according to any of embodiments 9 to 11, where the composition (Z1) comprises, based on the entire composition (Z1) of the filler (F1), a quantity in the range from 5 to 55% by weight.
13. The valve stem according to any of embodiments 9 to 12, where the Shore hardness of the thermoplastic polyurethane is in the range from 85 A to 85 D.
14. The valve stem according to any of embodiments 9 to 13, where the modulus of elasticity of the thermoplastic polyurethane is in the range from 500 to 8000 MPa, determined in the tensile test in accordance with DIN EN ISO 527.
15. The valve stem according to any of embodiments 9 to 14, where the thermoplastic polyurethane is based on an aromatic isocyanate.
16. The valve stem according to any of embodiments 9 to 15, where the valve comprises a valve base made of a thermoplastic material.
17. The use of a valve according to any of embodiments 1 to 8 for the production of a molding comprising an inflatable tube section.
18. The use according to embodiment 17, where the molding is an inner tube for a tire.
19. The use of a valve according to any of embodiments 1 to 8 for the production of a tubeless bicycle tire.
20. A molding comprising an inflatable tube section and a valve according to any of embodiments 1 to 8, where the tube section and the valve have connection to one another by way of a valve base.
21. The molding according to embodiment 20, where the molding is an inner tube for a tire.

The invention is explained in more detail below with reference to examples.

EXAMPLES

1. Example 1 (Materials Used)

Chopvantage HP3550 EC10-3,8: Glass fiber from PPG Industries Fiber Glass, Energieweg 3, 9608 PC Westerbroek, The Netherlands. E glass, Filament diameter 10 μm, length 3.8 mm.

TPU 1: TPU of Shore hardness 75 D, based on polytetrahydrofuran (PTHF) with molecular weight (Mn) 1000 daltons, 1,4-butanediol, MDI.

TPU 2: TPU of Shore hardness 80 D, based on polytetrahydrofuran (PTHF) with molecular weight (Mn) 1000 daltons, 1,4-butanediol, MDI.

TPU 3: TPU of Shore hardness 60 D, based on polytetrahydrofuran (PTHF) with molecular weight (Mn) von 1000 daltons, 1,4-butanediol, MDI.

TPU 4: TPU of Shore hardness 65 D, based on polytetrahydrofuran (PTHF) with molecular weight (Mn) von 1000 daltons, 1,4-butanediol, MDI.

TPU 5: Glass-fiber-filled TPU of Shore hardness 70 D, produced by compounding to incorporate 20% of Chopvantage HP3550 EC10-3,8 glass fiber into TPU 3.

TPU 6: Glass-fiber-filled TPU of Shore hardness 75 D, produced by compounding to incorporate 20% of Chopvantage HP3550 EC10-3,8 glass fiber into TPU 4.

2. Example 2

Each of the materials TPU 1, TPU 2, TPU 5 and TPU 6 was used to manufacture a valve stem of length 58 mm and external diameter 6 mm. In each case, bicycle tubes were produced with valves using these valve stems.

3. Example 3

Tube Test on Dynamic Drum Tester
Brake: Magura HS33
Wheel: Whizz Wheels DP18 622x15C with Schwalbe high-pressure tubeless tape and temperature sensor Tire: Schwalbe ONE V-Guard, Folding 23-622 B/B-SK HS448 OSC 127EPICurrent Standard—11600514

Tube: Schwalbe SV20E EVOLUTION TUBE 18/25-622/630 EK 40 mm, with weight 32 g, tube thickness 0.25 mm, tube internal pressure 8 bar.

At velocity 25 km/h, the wheel was loaded by braking at 10 V. The temperature increase caused by the braking action was on average to 115° C. (measured in the wheel rim). This corresponds approximately to the dynamic loading arising under practical conditions. The stem experiences stress resulting from both temperature and braking force.

| Material of valve stem | Test | Comments |
|---|---|---|
| TPU 1 | 1 | The valve stem buckled |
|  | 2 | The valve stem buckled |
| TPU 2 | 1 | The valve stem buckled |
|  | 2 | The valve stem buckled |
| TPU 5 | 1 | The valve stem did not buckle |
|  | 2 | The valve stem did not buckle |
| TPU 6 | 1 | The valve stem did not buckle |
|  | 2 | The valve stem did not buckle |

The valve stems made of glassfiber-filled TPU are superior to the TPU that is not glassfiber-filled. The glassfiber-filled stems exhibit no deformation of any kind. Buckling of the valve stem is symptomatic of the standard TPU embodiments.

4. Example 4

Flexural Test—Determination of Flexibility and Resilience

For determination of the abovementioned properties, various tube samples were assembled with tires on a commercially available bicycle wheel. The bicycle wheel was fixed, and an area of 3 mm² at a defined point on the valve stem was subjected to load in a conventional tensile/pressure tester (apparatus from Zwick/Roll). The maximum displacement (outward travel of the pressure tester) is 7 mm, starting from contact with the valve stem.

The bending of the stem, depending on design, is then so great that contact with the area is broken. The average force (N) reached in achieving max. displacement is determined. The range for the stems made of TPUs 1 and 2 is from 170-186N. For the glassfiber-filled stems made of TPUs 5 and 6 it is 108N (TPU 5) and 140N (TPU 6). The glassfiber-reinforced material therefore ensures substantially greater flexibility. The glassfiber-filled stems (TPU 5 and 6) moreover return to the starting position after max. bending. The standard TPUs (TPU 1 and 2) retain the deformation after bending; the material does not recover.

5. Example 5

Deformation Due to Heat in the Static State

Various tubes with standard TPU stem, and also with glassfiber-filled stems were stored in sunlight at outdoor temperatures of 35° C. The temperature on the black external carcass of the tire was determined every 30 min. All of the standard TPU (TPU 1 and 2) stems exhibited major loss of air due to swelling of the stem. The temperature was about 70° C. The glassfiber-filled stems exhibited no loss of air.

6. Example 6

High-Pressure (>6 bar) Inflation of a Bicycle Tube

Bicycle tubes having valve stems with and without glassfiber filler were compared in inflation up to an air pressure of 10 bar. This value corresponds to the upper limit of use in the racing bicycle sector. Inflation was achieved by using two commercially available track pumps, which are secured on the valve stem by means of rubber seal and clamping mechanism. It was found here that in the case of the valves made of thermoplastic without glassfiber filler, these having a smooth surface structure, adhesion between stem and air pump head is inadequate. During high-pressure (>6 bar) inflation the air pump head, secured by means of a clamping mechanism, separates from the valve stem. This makes inflation difficult or impossible.

The glassfiber-filled valve stems exhibit, by virtue of the additive, substantially greater surface roughness, which ensures intermeshing of the pump head or of the rubber seal. The tubes with glassfiber-filled stem can be inflated up to 9 bar without any undesired separation of the pump head.

| Testing of inflation properties as a function of surface quality | | |
|---|---|---|
| Valve type/Pump | SKS | Topeak |
| Brass valve | 10 bar | 10 bar |
| Standard TPU | 7.3 bar | 6.8 bar |
| TPU with glassfiber filler | 10 bar | 10 bar |

Pump I: SKS Rennkompressor
Pump II: Topeak Joe Blow Sport II
Tire: Schwalbe One 23-622 (max. air pressure 10 bar)

The invention claimed is:

1. A tire valve comprising a tubular stem, where the stem consists of a composition (Z1) comprising a thermoplastic (P1) and comprising a filler (F1),
    where the filler (F1) is fibrous having a fiber diameter of from 3-30 μm.
2. The valve according to claim 1, where the thermoplastic (P1) is a thermoplastic polyurethane.
3. The valve according to claim 1, where the composition (Z1) comprises, based on the entire composition (Z1), a quantity in the range from 5 to 55% by weight of the filler (F1).
4. The valve according to claim 2, where the Shore hardness of the thermoplastic polyurethane is in the range from 85 A to 85 D.
5. The valve according to claim 2, where the modulus of elasticity of the thermoplastic polyurethane is in the range from 500 to 8000 MPa, determined in the tensile test in accordance with DIN EN ISO 527.
6. The valve according to claim 2, where the thermoplastic polyurethane is based on an aromatic isocyanate.
7. The valve according to claim 1, where the valve comprises a valve base made of a thermoplastic material.
8. A valve stem for the production of a tire valve, where the valve stem is tubular and consists of a composition (Z1) comprising a thermoplastic (P1) and comprising a filler (F1),
    where the filler (F1) is fibrous having a fiber diameter of from 3-30 μm.
9. The valve according to claim 1, wherein said filler is at least one filler selected from the group consisting of glass fiber, carbon fiber, aramid fiber, potassium titanate fiber, liquid-crystalline polymer fiber and organic fibrous filler.
10. The valve according to claim 1, wherein said filler is glass fiber.
11. The valve according to claim 1, wherein said filler has a fiber diameter of from 6-20 μm.
12. The valve according to claim 1, wherein said filler has a fiber length of from 20-1000 μm.
13. The valve according to claim 1, wherein said filler has a fiber length of from 180-500 μm.

14. The tire valve according to claim 1, wherein said composition has a greater flexibility than that of said thermoplastic in the absence of said filler.

\* \* \* \* \*